Patented Feb. 12, 1952

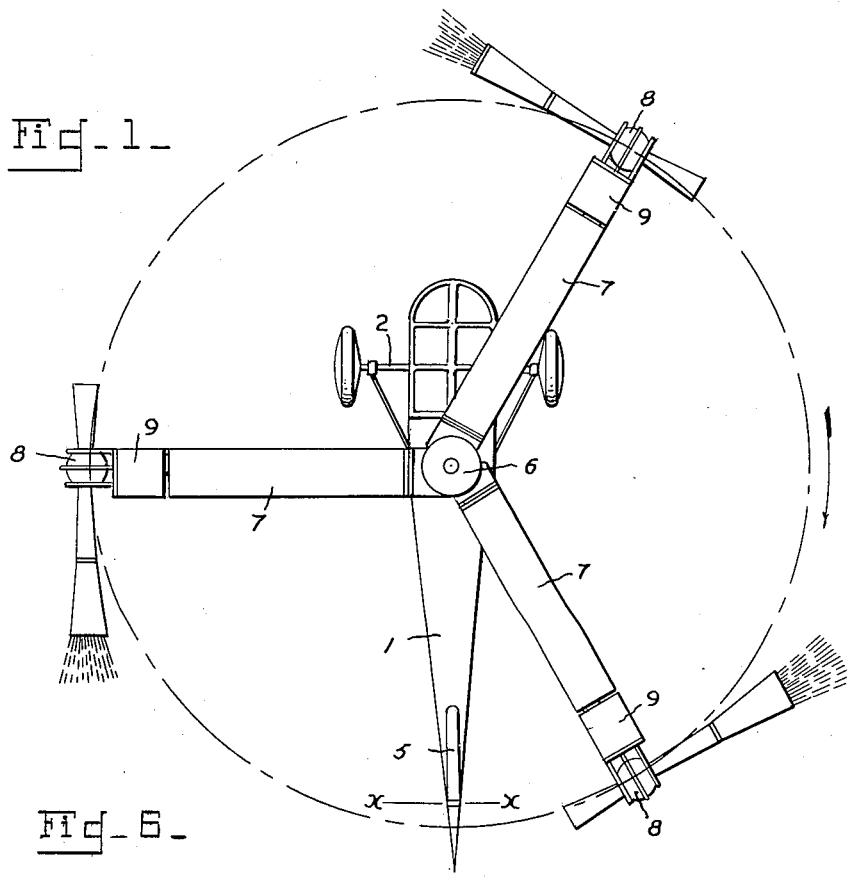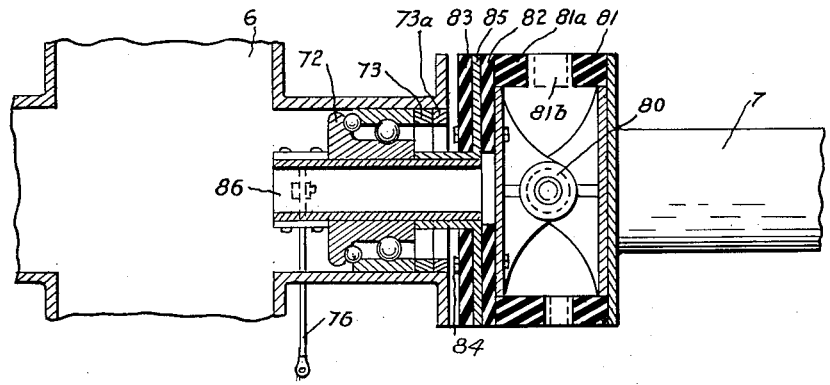

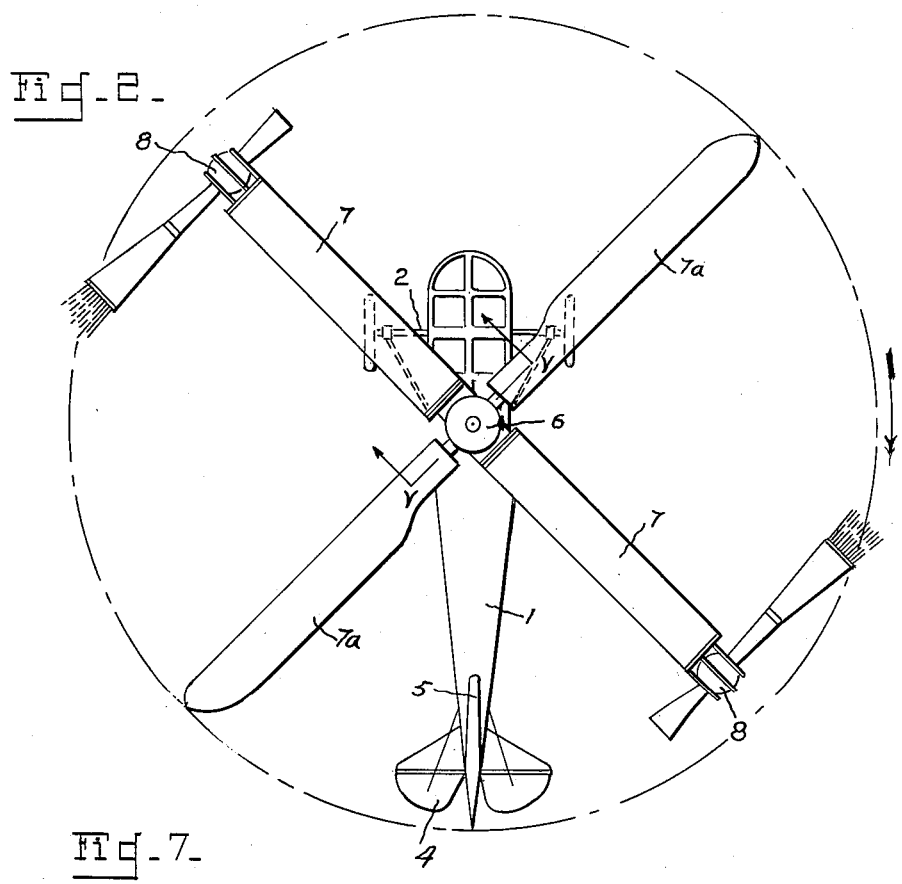
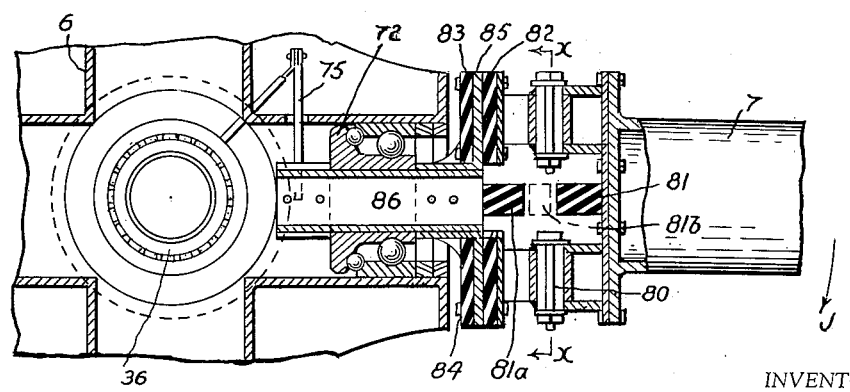

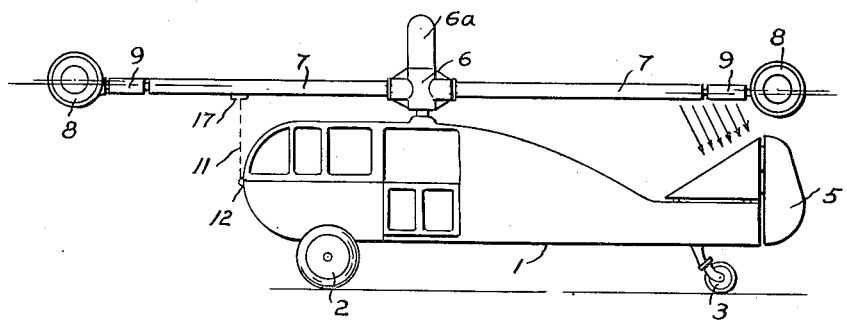
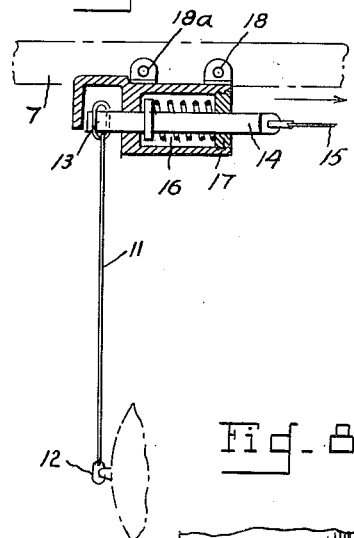
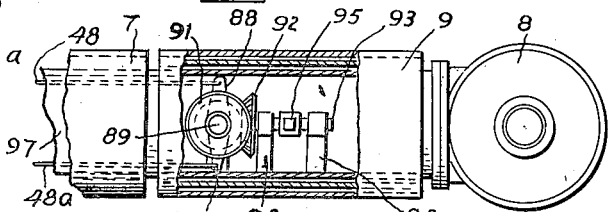
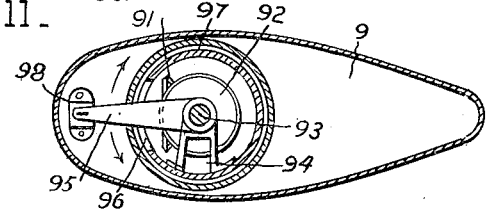
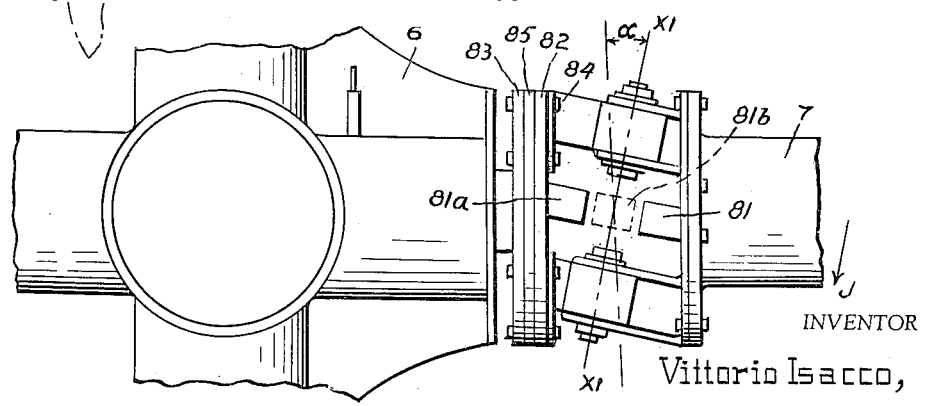
INVENTOR
Vittorio Isacco,
BY
ATTORNEY

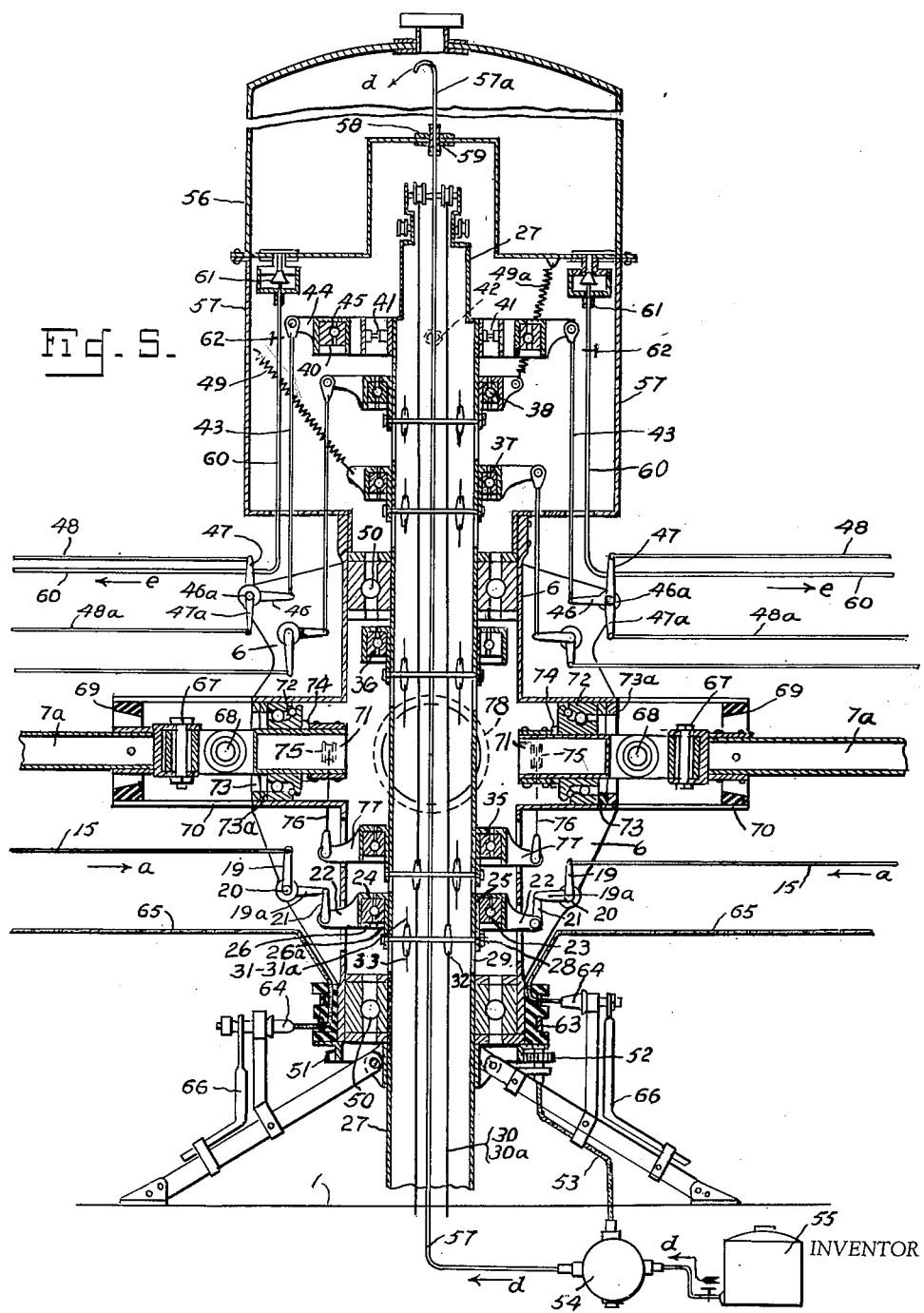

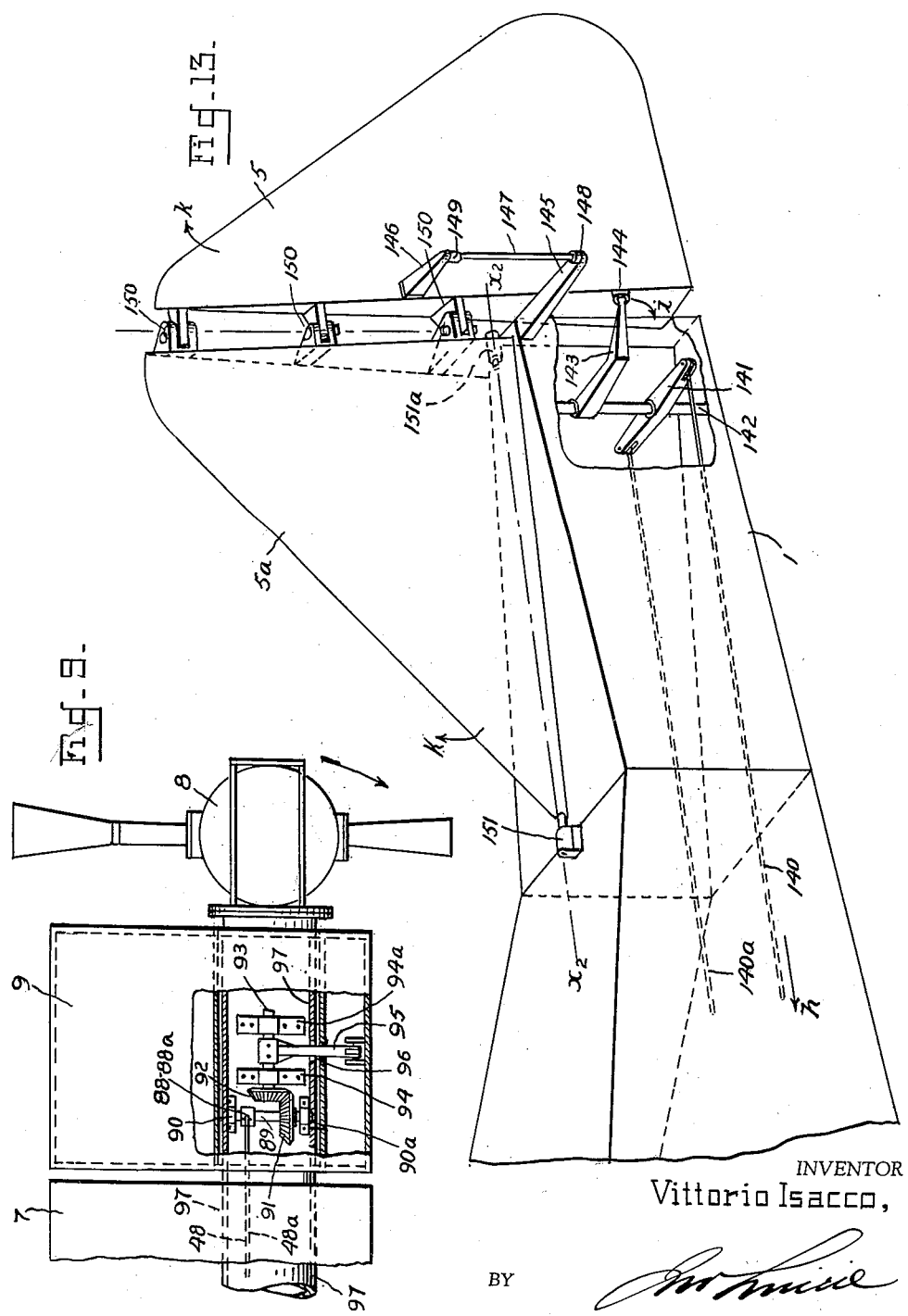

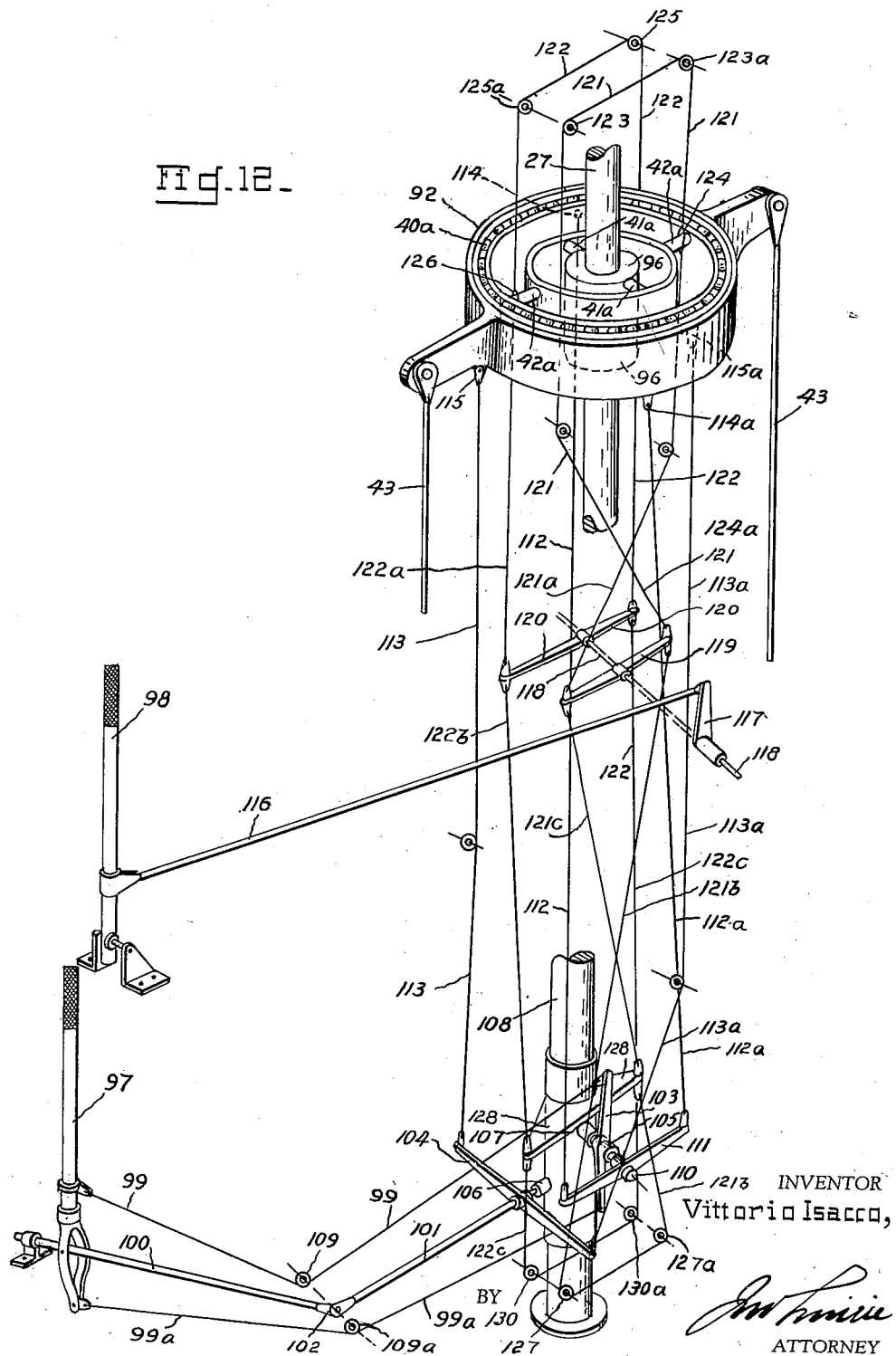

2,585,468

UNITED STATES PATENT OFFICE 2,585,468

FUEL SUPPLY SYSTEM FOR HELICOPTER WITH JET-DRIVEN ROTOR

Vittorio Isacco, London, England

Application August 3, 1946, Serial No. 688,269
In Great Britain August 3, 1945

1 Claim. (Cl. 244—17.11)

This invention has reference to improvements in helicopters of the kind wherein the blades of the propeller or some of them are provided with driving engines.

One feature of the invention resides in the provision at or in the vicinity of the axis of rotation of the hub of the propeller, of an auxiliary fuel tank adapted to supply the fuel to engines on the blades. This tank or part of it may be stationary, the fuel being fed to the engines by means comprising a distributer having a part rotatable with the propeller but the auxiliary tank is preferably rotatable as a whole with the propeller. A pump adapted to feed fuel to the auxiliary tank from the main tank located in the fuselage is provided and this pump is preferably driven by a drive transmission from the rotating propeller.

The advantage of the auxiliary tank as above set forth is that a single tank can be utilised for two or more engines and the weight of the rotor is less than it would be were the tanks in the blades thereof.

A further feature of the present invention resides in the provision in a helicopter of a rotor which is provided at or in the vicinity of the tips of its blades or some of them with driving engines, preferably jet propulsion units, and which is adapted both to sustain the machine and to propel it (as distinct from merely sustaining it whilst the machine relies for propulsion on an engine fixed in relation to the fuselage and an air-screw as in my British Patent Specification No. 250,534). Jet propulsion units are to be preferred because they are more suitable for use with the sustaining driving rotor.

Other features of the present invention comprise the following:

1. The rotor blades are adapted to have a limited degree of flap by the provision of hinge joints at their root ends; and the axes of the hinges are preferably out of perpendicular in relation to the longitudinal axes of their respective blades in order to produce an automatic variation of the pitch angle of the blades when they are subjected to air over pressures. This variation is such that the pitch angle decreases when the blades are lifted and increases when they are depressed. Such an automatically operating device ensures that the blades are not subjected to excessive stresses and, in addition, assists the stability of the machine when in translation flight. The degree of flap is preferably limited by resilient stops.

2. The following means are provided either to ensure lateral and longitudinal stability of the machine or to enable the machine to be inclined in the direction of horizontal flight.

a. Ailerons adapted to be periodically varied as to pitch angle are mounted at the tips of the blades provided with propulsion means either before or after the said means in the case of those blades provided with such propulsion means, said ailerons either being mounted so as to be turnable around axes coincident with the longitudinal axes of the respective blades or being mounted so as to be turnable around axes parallel with the said longitudinal axes, the said ailerons constituting continuations of the blades.

b. Blades which are not provided with propulsion means are adapted to be differentially varied as to pitch angle.

c. a and b in combination, i. e., applied to a rotor comprising both blades with engines and blades without engines.

3. Means adapted releasably to hold the rotor against turning said means being under the control of the pilot as to release of the rotor and being provided to enable the propulsion means to be set into operation, one at a time if necessary, without the rotor being driven. Such means may comprise a wire which is connected at one end to the fuselage and is releasably connected at its other end to a blade.

4. A vertical rudder which is adapted to turn on a horizontal axis and on a vertical axis, the movements taking place simultaneously in order to enable the pilot to control the direction of the machine while hovering and while in horizontal flight. When the machine is hovering the inclination of the rudder around the horizontal axis will enable the pilot to produce the necessary couple for directing his machine around a vertical axis.

5. Blades, which may be limited as to flap upwards and downwards as set forth in (1) above and provided with propulsion means are mounted so as resiliently to yield to drag pressures, such mounting permitted of only slight oscillation in the direction of drag pressure (i. e., in the plane of rotor rotation).

6. A device which permits of the general pitch angle variation of the blades and of the periodical variation of the pitch angle for stability purposes by means of a single control lever solid with the inner tips of the blades.

The invention will now be described with reference to the accompanying drawings which are given by way of example for each case and which comprise the following:

a. Means for driving the rotor for the different practical sizes of the machine.

b. Means for feeding fuel and for controlling the jet propulsion units mounted on the blades.

c. Means for allowing the blades to rotate after the propulsion units have been started.

d. Means for controlling the lateral and longitudinal stability of the machine or for inclining the machine in order to achieve horizontal flight.

e. Necessary controls.

*f.* Means for attaching the blades to the rotating hub whether or not they are fitted with jet propulsion units.

*g.* Means for compensating for the friction of the rotating rotor, ball-bearing controls, and fuel pump on the central shaft of the machine or for assuring the control of the machine around a vertical axis, and

*h.* The general aspect of the machine in two types given as examples, the first when all the blades are provided with engines, and the second when some of them are provided with engines.

In the said drawings:

Fig. 1 is a top view of the helicopter with jet propulsion units mounted at the tips of the blades, the stability ailerons being located between the units and the blades. These ailerons constitute a prolongation of the blade. The horizontal elevator at the rear of the fuselage is not indicated, as in certain cases it can be dispensed with.

Fig. 2 is a top view of the helicopter with the jet propulsion units mounted on only two of the blades. In this machine the stability is assured by a periodical variation of the pitch angle of the blades.

Fig. 3 is a side view of the machine with a cable in position to prevent the blades from rotating while the engines are started.

Fig. 4 is an example of the release device which allows the pilot to release the blades at his will after the propulsion units are started.

Fig. 5 is a general vertical cross-section on the line V—V, Fig. 2 showing the various controls of the machine, the attachment of the blades to the central hub when they carry no propulsion units, and the system of the fuel feeding of the rotating propulsion units from a main tank located inside the fuselage to the upper rotating auxiliary fuel tank and from there to the propulsion units.

Figs. 6 and 7 are vertical and horizontal cross sections, respectively, showing the method of mounting the blades on the central hub for those blades which are provided with propulsion units.

Fig. 8 is a top view of the mounting of the blades comparable with Fig. 7 but with the axis of the horizontal joint not perpendicular to the longitudinal axis of the blades.

Figs. 9, 10 and 11 show respectively a top view, a front view and a side view of the position and method of control (as an example), of the stability ailerons.

Fig. 12 is a perspective view showing, more particularly, the system of wires and pulleys used to operate any of the controls and as well the device allowing the general pitch angle device and the stability controls to operate simultaneously or separately on the same tube ending the blades; and Fig. 13 is a perspective view of the method of controlling the vertical rudder of the fuselage, both around a vertical axis and around a horizontal axis.

Figs. 1, 2 and 3, show the helicopter machine, constituted by a fuselage 1, the usual landing gear 2 in the front and 3 at the rear where are mounted also the usual elevator 4 (Fig. 2 only) and the vertical rudder 5.

The elevator 4 can be eliminated in certain cases, and for that reason it is not indicated in Fig. 1. The vertical rudder 5 can rotate as usual around a vertical axis but here it also rotates around a horizontal axis as will be described.

The object of the second hinging movement of the elevator is to enable the air flow projected by the blades during rotation to be utilised in order to create a couple capable of rotating the machine around its vertical central axis, thus allowing the pilot to direct his machine in any direction around the said axis (see Fig. 3).

On the central hub 6 of the blades, located above the fuselage 1 are mounted the blades 7 (Fig. 1) and 7, 7a (Fig. 2) of the sustaining and propulsive propeller.

Inside the central hub 6 and its extension 6a are located all the controls of the machine and the fuel reservoir as will be described.

In Fig. 1 all the blades are driven separately by jet propulsion units 8 mounted on their tips beyond the stability ailerons 9 which ailerons constitute a prolongation of the said blades.

In Fig. 2 only two blades 7 are driven by units 8, and the other blades 7a (two in this example) are not fitted with engines. The proportion of the blades provided with engines to those not so provided, depends on the available power of the engines and on the size of the machine. This is also the reason why different methods are utilised to stabilize or to incline the machine in the required direction of flight, as will be described.

In Fig. 2 the stabilising system is provided by the periodical or differential variation of the pitch angle of the whole of each blade 7a.

The periodical or differential variation of the pitch angle of the ailerons or the blades consists in the variation of the angle of incidence of the blades or ailerons periodically during one revolution, in such a way, that the angle of incidence becomes greater at 90° to the side at which the inclination of the machine's shaft is required, and smaller at 180° from the position where the incidence is greater. Between these two opposite positions and at 90° to each of them, the incidence shall not be altered.

In Figs. 3 and 4 is shown an example of the means for releasing the rotating blades from the fuselage to which they have to be previously attached in order to start the propulsion units. In the example the lower end of a wire 11 is fixed at 12 to the nose of the fuselage and the upper end of the wire is fixed to a loop 13. A belt 14 passes through the loop and has a wire 15, which can be pulled in the direction of the arrow *a* by the pilot, attached to it. A spring 16 restores the bolt to its normal position when the wire 15 is released. The body 17 containing both the bolt 14 and the spring 16 is attached at 18 and 18a, to a hollow part of the blade 7 at the under part thereof.

It will be clear that when the jet propulsion units are started and the blades are required to rotate the pilot has to pull the wire 15. When he does this the hook 13 is released and the wire 11 falls. It may be automatically wound-up inside the nose of the fuselage by a retractive device, such as a spring roller, not shown in the drawings.

The centres of the jet propulsion units are preferably slightly above the longitudinal axes of the blades 7 as shown in Fig. 3.

In Fig. 5 all the control systems are shown, but only one will be described in detail as all are substantially similar. The lateral and longitudinal control systems are different from each other and will be separately described herein.

The release wire 15 is attached to a lever 19, 19a (Fig. 5) free to rotate around axis 20 fixed to the hub 6. Levers 19, 19a are connected to levers 21 hinged to legs 22 on the control ball bearing system, the legs 22 being diametrically opposite each other.

The control ball bearing system comprises the following:

A ball bearing 23 is located between two cases 24 and 25 respectively and maintained in position by nuts 26, 26a. Case 25 can slide along the central shaft 27, this sliding movement being effected by means of a pin 28 passing through convenient slots 29 made in the central supporting shaft 27. The ends of the pin 28 are fixed with the case 25. The pin 28 is moved upwards or downwards by means of a double set of flexible wires 30, 30a, and 31, 31a operated by the pilot, one wire of the set 30, 30a being attached to the pin 28 at 32 and the other set being attached to the pin at 33. In this manner the pin is operated on at two opposite points simultaneously.

The way in which the wires are operated and the way in which they are located within the central shaft is shown in Fig. 12 and will be described hereinafter.

The operation of the ball bearing system is therefore as follows:

When the pin 28 is operated (pulled upwards or downwards) the whole system will slide along the central shaft 27 and in addition the outer case 24 fixed with the outer ring of the ball bearing 23, the legs 22, the levers 19, 19a and 21 will continue to rotate with the blades.

To pull the release wire 15 according to arrow $a$ the pin 28 and therefore the ball bearing system have to be pulled downwards.

The operation of the other controls is similar.

In Fig. 5 above the release control is located the general pitch control ball bearing system 35 of the blades but only for those blades which carry no propulsion units.

Another ball bearing system 36 similar to the previous one is provided to vary the pitch angle of the blades which are driven by jet propulsion units. The change of incidence requirements for blades carrying the engines as compared with those which carry no engines, can in certain cases be different, separate pitch angle variation controls are, therefore, provided.

In other cases, a single ball bearing control system can be provided for all blades, in this case the ball bearing system 36 is eliminated and the ball bearing 35 has four connecting rods 76 instead of two.

Above the previously described control, is shown the ball bearing systems 37 and 38 respectively of the engine throttle controls, one for each propulsion unit. In this example two blades with propulsion units are considered.

Finally, the last ball bearing control system 40 is shown above the others. This system is for the lateral or longitudinal control of the ailerons for stability purposes or for inclining the shaft of the machine in order to achieve horizontal flight in the direction required.

This system does not slide along the shaft 27 as do the others, but is mounted on this central shaft by means of gimbal joints 41 and 42 which enables universal inclination of the bearing system.

When the system 40 is inclined it is clearly seen that the rods 43 which are connected to the legs 44 of the exterior casing 45 of the bearing will be subject to upwards and downwards movements during one revolution thus achieving what I have called a differential variation of the incidence of the ailerons during each revolution.

The rods 43 are connected to crank levers 46 which are fixed with their respective shafts 46a and the shafts are fixed with straight levers 47 and 47a. Wires 48 and 48a are connected to the levers 47 and 47a which wires, after crossing inside the blades, operate the ailerons as is shown in Figs. 9, 10 and 11 and as will be described with reference thereto.

The pulleys around which pass the wires operating the various ball bearing systems just described, are located on the top of the central shaft 27. In the drawing only two wires which operate the blades' release device and the blades' general incidence, are shown passing over the pulleys.

For the ball bearing systems which operate on one side only, namely for the throttle controls, compensating springs 49 and 49a are fitted on the opposite side from which the action takes place in order to equalize the reaction on the bearing and assure an easy sliding movement along the central shaft.

The hub 6 bears against the central shaft 27 by means of ball bearings 50 which can withstand both radial and axial pressures.

Fig. 5 shows also the fuel feeding system. To the lower part of the hub 6 is fixed a spur wheel 51 which operates a pinion 52. The pinion, by means of a flexible transmission 53, drives the fuel pump 54. The fuel pump, located inside the fuselage 1, takes fuel from the main tank 55 and delivers it to the upper rotating reservoir 56 through the tubes 57 and 57a according to the arrows $d$. The said tubes are suitably mounted inside the shaft 27.

The fuel reservoir 56 is fixed to the hub 6 by means of a cylinder 57 and therefore both rotate with the hub 6. The tubes 57 and 57a being fixed to the central shaft 27, the reservoir 56 has to rotate around it. To avoid any leaking of fuel at the hole through which the tube 57a passes through the fuel reservoir 56, special joints are fitted as well as antifriction rings 58 and 59. This friction is very small.

The fuel inside the reservoir 56 rotates with it and by virtue of the centrifugal force and of gravity, since the reservoir 56 is located well above the blades and the engines, the fuel is carried from the reservoir 56 by tubes 60 and conducted by them inside the blades to the engines, according to arrows $e$. Joints 61 of conventional form and cocks 62 are fitted below the reservoir 56.

The ignition system, comprising slip rings 63, carbon brushes 64, cables 65 connected to the engines and cables 66 connected to switches inside the cockpit has already been described in my previous British Patent No. 332,312.

The roots of the blades 7a (the blades which are not provided with propulsion units) are attached by means of a double joint articulation 67 and 68 to the hub. The vertical articulation 67 allows for lateral oscillations which are strongly braked and limited by an elastic ring 69 fixed on extensions 70 of the hub 6. The horizontal component 68 is limited in its upward and downward oscillations by stops on the rubber ring 69.

The horizontal articulation ends with the tube 71 passing into the interior of a double thrust ball bearing 72 the outer race of which is mounted inside the hub 6.

Ring nuts 73 and 73a on hub 6 and 74 on tube 71 maintain the ball bearing in position. On the other side of each ball bearing 72 is fixed a lever 75 (see also Fig. 7).

This lever is connected through rod 76 to the leg 77 of the general incidence ball bearing control system 35.

It will be seen that when the system 35 is made to slide along the central shaft 27 the pitch angle of the blades will be altered while the blades remain free for lateral and vertical oscillations.

In Fig. 5 is shown in dotted lines at 78 the arms of the hub 6 to which are attached the blades 7 carrying the propulsion units. Therefore Fig. 5 refers to the machine as shown in Fig. 2 in which two blades 7 carry jet propulsion units and two others 7a are not driven.

In Figs. 6, 7 and 8 is indicated in detail, how the blades carrying the propulsion units are mounted inside the hub.

The root end of the blade 7 is continued in this case by only a horizontal articulation 80. Elastic stops 81 and 81a limit the vertical oscillations, which can be reduced to any amplitude by interposing additional elastic stops 81b. For the lateral attachment, generally no articulation is provided, but the attachment is made elastic in this example by means of elastic plates 82, 83 fitted on both sides of the attachment bolts 84.

On the other side of the horizontal articulation 80 the plate 85 is fixed with the tube 86 entering and fitted inside the hub 6 as previously described for the blade 7a.

The pitch control of the blades 7 is similar to that for the blades 7a but a separate ball bearing control system 36 (Fig. 5) is provided in certain cases, as previously stated.

In order to reduce the pitch angle of all the blades 7 and 7a, when an over-pressure tends to raise these blades, the horizontal articulation axis $x, x$ (Fig. 7) which was perpendicular to the longitudinal axis of the blades, can be set at an angle $\alpha$ to it, such as $x_1, x_1$, (Fig. 8) in the direction of the rotation which is indicated by arrow $g$.

The horizontal articulation 68 of the blades 7a (Fig. 5) can be mounted in a similar way.

In Figs. 6, 7 and 8, the horizontal articulations 80 are indicated in two parts, which give a stronger fitting in this lateral direction.

The periodical control of the ailerons, which constitute the outer-part of the blades 7, is as follows:

Fig. 5 shows how the wires 48 and 48a are pulled or released alternatively and periodically during one revolution of the rotor, when the control ball bearing system 40 is tilted in any direction around the universal joint articulations 41 and 42.

The wires 48 and 48a after crossing inside the blades 7 are attached to the double lever 88 and 88a fixed with a shaft 89 which is free to rotate in supports 90 and 90a, located in the interior of the aileron 9 (Figs. 9, 10 and 11).

To the same shaft 89 is fixed a bevel wheel 91 which is therefore caused to rotate alternatively in one direction and the other during one revolution when the wires 48 and 48a are operated.

Bevel wheel 91 engages with the bevel pinion 92 that is fixed with the shaft 93 which is freely journalled in supports 94 and 94a. Between these supports is fixed a lever 95 which passes through a slot 96 in the spar 97. The lever 95 is hingedly connected at 98 to the leading edge of the aileron 9.

This aileron is mounted free to rotate around the tubular spar 97 of the blade and it is obvious that its angle of incidence will be regulated by the position of the lever 95 (Fig. 11).

When the bevel wheel 91 is alternatively operated the pinion 92 and hence the lever 95 will also be alternatively operated and in consequence, the aileron will have its pitch angle varied in one revolution from a maximum positive value to a minimum positive or negative value.

When the blades 7a are operated so that their pitch angle is varied differentially in one revolution in order to achieve the same results in place of the ailerons, the ball bearing system 40, which is universally movable on the double joint articulation 41 and 42, will have its operating rods 43 connected to the levers 75 which are secured to the end tubes 71 of these blades (Fig. 5).

On the other hand, I have described how the pitch of all blades 7a is simultaneously varied by the ball bearing system 35 which is made to slide for that purpose along the shaft 27.

It is evident that in such a case these two ball bearing systems connected to the same lever 75 cannot operate separately.

Therefore, when the blades are acted differentially for stability purposes and simultaneously for the general variation of their pitch angle, a single ball bearing system is utilised in place of the system 35.

In Fig. 12 is shown how both these controls can be operated by the same ball bearing system which can be universally hinged about and, simultaneously, slidable along the central shaft.

The control of the sliding movement of this system is identical with the control of the sliding movements of the other ball bearing systems, namely 23, 35, 36, 37 and 38.

The ball bearing system 40a has now the interior joint articulation 41a fixed to a sleeve 96 which can slide along the central shaft 27.

The stability control lever 97 and the general pitch control lever 98 are located in the pilot's cockpit at a far greater distance than is shown in the drawing.

As usual in aeroplanes, the longitudinal stability is achieved by the action on the wires 99 and 99a attached to lever 97 which is adapted to be operated forwards or backwards, while the lateral stability is achieved by operating the lever 97 to the left or to the right, thus operating the rod 100 in torsion. In reality, owing to the gyroscopic reaction of the rotor, the stability action will be at 90° to the direction in which the upper system 40a is tilted.

The rod 100 is joined to another rod 101 by means of a joint 102 which has to be as near as possible to lever 97 and as far as possible from the central shaft 27.

The wires 99, 99a, and the rods 100, 101 operate respectively the levers 103 and 104, which rotate freely on supports 105 and 106, both fixed with a sleeve 107 capable of sliding freely along a vertical shaft 108 fixed on the floor of the fuselage. The wires 99 and 99a pass around the pulleys 109 and 109a which are substantially coaxial with the joint articulation 102.

On the same shaft 110, with lever 103, is fixed another lever 111 almost at right angles to lever 103. The levers 111 and 104 are respectively attached the wires 112, 112a and 113, 113a all rising vertically. They are respectively attached to the ball bearing system at 114 and 114a, and at right angles at 115 and 115a.

It is clear that when the lever 97 is operated, the ball bearing system will hinge around its joint articulations 41a and 42a and the operating rods 43 will be raised and lowered during one revolution.

To lever 98 is attached a rod 116 which is connected to a lever 117 that is fixed with a shaft 118 and on which are fixed two levers 119 and 120. To lever 119 are attached two cable wires 121, 121a which are crossed, and to lever 120, two other wires 122, 122a which are not crossed.

The wire 121 passes freely through the ball bearing system and passes round the pulleys 123, 123a and is then attached at point 124 to the ball bearing system. The wire 121a extends between the attachment 124 and the lever 119.

The wire 122 also passes freely inside the ball bearing system and round pulleys 125, 125a and then is attached to the ball bearing system at 126 which is opposite to the attachment 124. The wire 122a extends from the attachment 126 to the lever 120.

It is clear that when the lever 98 is moved forwards or backwards, the ball bearing system will be raised or lowered along the central shaft 27, and hence both operating rods 43 will have movement of the same magnitude, thus achieving an equal change in the pitch angle of the blades.

It is also clear from the drawing, that when this sliding movement is effected, the wires 112, 112a and 113, 113a will be operated, and that the latter operation will be possible only if the levers 104 and 111, to which they are attached at their lower ends, can move upwards or downwards by the same length.

This is achieved by connecting the lower sleeve 107 to the levers 119 and 120 so that it can slide along the tube 108 at the same time and to the same extent as that of the ball bearing system along the shaft 27.

To lever 119 is attached the wire 121b which passes around the pulleys 127 and 127a and is then attached to an arm 128 carried by the sleeve 107. From the same arm extends another wire 121c, in crossed relation to wire 121b and then attached to the other end of lever 119.

In the same manner, but not crossed, are attached to lever 120 the wires 122b, 122c. Wire 122a is attached to an arm 129, opposite the arm 128, and also fixed with sleeve 107. Then, is attached on the same point the wire 122c, which passes round the pulleys 130, 130a and from there directly to the other end of the lever 120.

It is clear to see that with this device, the sleeves 96 and 104 will slide equally and in the same direction, when the general pitch control lever 98 is operated by the pilot.

By reason of the position of the articulation 102 of the lateral control rods 100 and 101 and of the pulleys 109, 109a guiding the longitudinal control wires 99, 99a the sleeve 107 can slide without materially affecting the lengths of these rods and wires although the necessary play, in practice very small, can be provided for.

The simultaneous rotation of the vertical rudder 5 and 5a mounted at the rear of the fuselage is effected as follows: (Fig. 13).

The wires 140 and 140a, which are operated in the usual way by the pilot's feet, are attached to the lever 141 that is fixed with the tube 142 which is freely rotatable around its vertical axis. A cranked lever 143 is also fixed to the same tube 142 and is attached by means of an articulated joint 144 near the bottom of the rudder 5.

Another lever 145, fixed with the upper part of the fuselage 1, is connected to the control lever 146, attached to the rudder 5, by means of the rod 147 articulated at its two ends by means of spherical joints 148 and 149.

The rear part 5 of the rudder is hinged as usual on the other part 5a by means of the vertical articulations 150. The second part 5a, which in standard aeroplanes is fixed with the rear of the fuselage, is not fixed with the fuselage in this case but can rotate around a horizontal axis $x_2$, $x_2$ by its mounting on supports 151 and 151a.

It can therefore be seen that when wire 140 is, for example, pulled according to the arrow $h$, the lever 141 will rotate according to arrow $i$, and so will lever 143. Both of the rudders 5 and 5a will rotate around ther horizontal hinges 151 and 151a, but as the part 5 is joined to the fuselage, which is a fixed point, by means of the levers 145 and 146 and the rod 147, part 5 will be obliged to rotate around the vertical hinges 150.

With this device the rudder achieves two distinct rotations, the first as a whole around a horizontal axis and the second for part 5 only around a vertical axis with reference to part 5a.

The same result is achieved even when axis $x_2$, $x_2$ is not exactly horizontal, as it may happen in practice.

It is evident that the invention is not limited by the devices described and that other forms of mechanism can be utilized as long as the principles are not altered.

For example, the number of blades can be different from those indicated in Figs. 1 and 2.

The double articulation of the blades 7a and the method of articulating the blades 7 can be made in any different way.

The device for controlling in a differential way the stability ailerons can be different.

The system described in order to concentrate on the same acting lever, the stability and general incidence controls, can be different.

The same for the method which enables the double rotation around a vertical and around a horizontal axis of the vertical rudder, and for its position which can be elsewhere on the fuselage, namely in front.

The two axes around which the vertical rudder can swing, are not necessarily horizontal and vertical, respectively.

The upper double pulley system over which cross the various control wires can be replaced by levers.

The ball bearing control systems for the change of the pitch angle of the blades which has been described as separate for the blades carrying engines and those without, can be the same for both types of blades.

The joint control of the general incidence and the differential change of incidence on the same tube ending the blades can be effected in many different mechanical ways.

The blades 7 can also be articulated around a vertical axis, the elastic stops allowing, in this case, very small lateral displacement of these blades.

The whole system of wires which controls the ball-bearing systems, can be replaced by rigid tubes, preferably located one inside the other. In such a case each set of four wires operating one of these systems, is replaced by a single tube joined to the same control pin which slides along the central column.

The horizontal articulation of the blades 7 and 7a can advantageously be located so that the corresponding axes pass exactly through or lie very near to the axis of rotation of the propeller.

What I claim is:

A helicopter comprising a fuselage, a sustaining unit including a plurality of rotary blades, jet propulsion units at the tips of at least some of said blades, a main liquid fuel tank inside the fuselage, an auxiliary liquid fuel tank above said blades and in the vicinity of the axis of rotation of the blades, fuel pipes connected to said auxiliary feed tank to supply liquid fuel by gravity to the propulsion units on the blade tips and extending through said blades for their whole length, and means to feed fuel from the main tank to the auxiliary tank.

VITTORIO ISACCO.

REFERENCES CITED

The following references are of record in the file of this patent:

UNITED STATES PATENTS

| Number | Name | Date |
| --- | --- | --- |
| 1,230,881 | Taylor | June 26, 1917 |
| 1,813,852 | Isacco | July 7, 1931 |
| 1,820,946 | Pitcairn | Sept. 1, 1931 |
| 1,932,702 | Langdon | Oct. 31, 1933 |
| 2,021,470 | Upson | Nov. 19, 1935 |
| 2,023,840 | Kay et al. | Dec. 10, 1935 |
| 2,074,342 | Platt | Mar. 23, 1937 |
| 2,330,056 | Howard | Sept. 21, 1943 |
| 2,371,687 | Gerhardt | Mar. 20, 1945 |
| 2,454,040 | Dalton | Nov. 16, 1948 |

FOREIGN PATENTS

| Number | Country | Date |
| --- | --- | --- |
| 804,408 | France | Aug. 3, 1936 |
| 366,450 | Great Britain | of 1932 |